Figures 1, 2, 3:
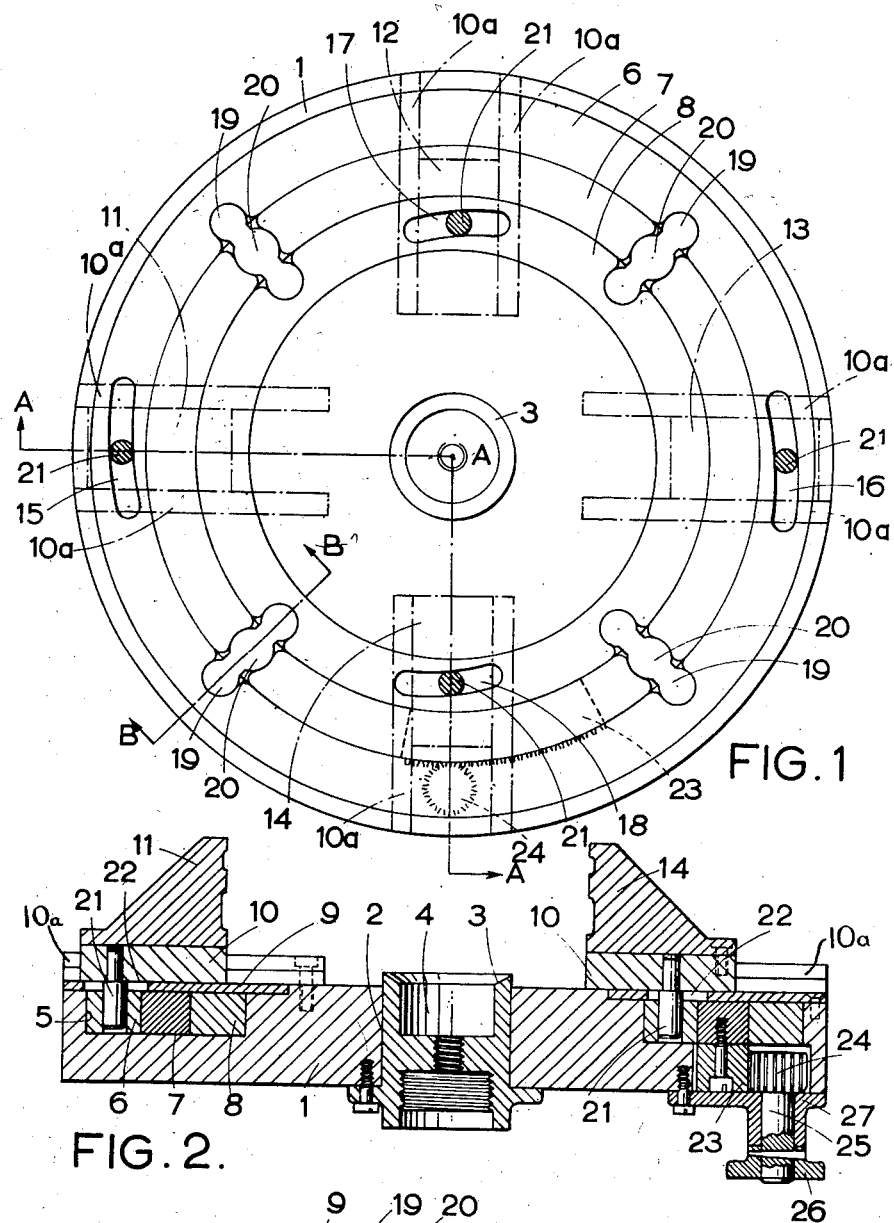

Feb. 5, 1957 E. D. RIDOUT 2,780,470
CHUCKS
Filed Nov. 29, 1954

Inventor
E. D. Ridout

United States Patent Office 2,780,470
Patented Feb. 5, 1957

2,780,470

CHUCKS

Edward David Ridout, Hayes End, England, assignor to Electric & Musical Industries Limited, Hayes, England, a company of Great Britain Application November 29, 1954, Serial No. 471,865

Claims priority, application Great Britain December 1, 1953

5 Claims. (Cl. 279—66)

The present invention relates to chucks.

In certain apparatus for example glass working lathes it is desirable that the chuck should be able to grip rectangular or elliptical objects and to maintain them centrally with respect to the axis of the lathe.

It is an object of the present invention to provide an improved chuck for accomplishing this desideratum.

According to the invention there is provided a chuck comprising a supporting member carrying more than two jaws, radially positioned guides mounting said jaws for radial movement and jaw operating mechanism therefor, said mechanism comprising first and second rotary members each having at least one jaw coupled thereto and common driving means intercoupling said first and second members for imparting rotary motion to said members to cause simultaneous radial movement of all of said jaws and radial movement of at least one of said jaws after the other jaws are in engagement with an object.

In order that the invention may be more fully understood and readily carried into effect, a chuck which is suitable for use with a glass working lathe will now be more fully described with reference to the accompanying drawings, in which:

Figure 1 shows a plan view of the face of the chuck with the cover plate removed, Figure 2 is a section taken on the lines A—A—A of Figure 1, and Figure 3 shows a section of a detail on the line B—B of Figure 1.

Referring to Figures 1 and 2 the chuck comprises a circular supporting plate 1 having a central aperture 2 enabling it to be secured over a circular dished shape hub 3 which will be attached to the head stock of a lathe said hub 3 preferably forming as shown a vacuum chamber 4 for temporarily or partially holding a glass object such as the bulb of a cathode ray tube in position during centring of the object.

An annular recess 5 of rectangular section is provided in the support plate 1 and into this recess 5 there is fitted a nest of three concentric rings 6, 7, 8 so as to be freely rotatable therein. Attached to the support plate 1 so as to enclose the rings 6, 7, 8 is a cover plate 9 having mounted thereon four slides 10 having jaws 11, 12, 13, 14 clamped thereto, the slides 10 being angularly spaced 90° apart and constrained so that they move in a radial direction by suitably disposed guides 10a.

The outer ring 6 is located by the outer diameter of the recess 5 in the support plate 1 and is of sufficient width to contain two arcuate eccentric slots 15, 16 arranged 180° apart. Each of these slots 15, 16, extend over a distance of 30–40° and have a lead pitch such that ample coverage is provided for the tolerances encountered with the various objects to be held i. e. a change in distance apart of the jaws 11, 13 of about 1 inch. The smallest concentric ring 8 which is termed the inner ring is constructed in a similar manner to the ring 6 so as to provide arcuate eccentric slots 17, 18 which co-operate with the jaws 12, 14 and it is arranged so that it is located in the recess 5 by the inner diameter thereof. The centre or driving ring 7 fits between the rings 6 and 8, its outside diameter bearing on the inside diameter of the ring 6 and its inside diameter bearing on the outside diameter of the ring 8. The three rings 6, 7 and 8 are mounted in the recess 5 so that the arcuate slots 15, 16, 17 and 18 are positioned 90° apart i. e. the start of the slots 15, 16 in ring 6 being 90° from the start of the slots 17, 18 in the ring 8.

The rings 6, 8 are connected to the driving ring 7 by means of toggle levers 19, for example four as shown in Figure 1, these levers 19 being spaced 90° apart so that they lie between the arcuate slots in both rings. The levers 19 are each pivoted at their centrepoints 20, said points 20 being located on the mean diameter of the ring 7. The levers 19 may be pivoted either by pinning into the ring 7 or by shaping their mid-portions as shown in Figure 1 so that they fit into circular recesses provided in ring 7. The extremities of the levers 19 are made circular and fit into circular recesses formed in the inner and outer rings 6 and 8, the centres of the circular end portions of the links co-inciding when positioned in said recesses with the mean diameters of the rings 6 and 8, a sufficient clearance being provided to allow the links to pivot through an angle of for example 20°. A section through one of the levers 19 on the line B—B of Figure 1 is shown in Figure 3.

Each of the slides 10 supporting the jaws 11, 12, 13, 14 also carries a pin 21 which protrudes through radial slots 22 provided in the cover plate 9 so as to engage with and follow the cam surfaces formed by the boundary walls of said arcuate slots 15, 16, 17 and 18.

Attached to the underside of the driving ring 7 is a rack 23 which engages with a pinion 24 keyed to a shaft 25 actuated by a wheel 26. The pinion passes through a clearance aperture in the support 1 and is held in position by a journal 27 secured to the underside of the support 1. Means not shown is preferably provided for locking the wheel 26 at any of its positions of rest.

The chuck is operated by rotating the wheel 26 causing rotation of the ring 7 which by virtue of the coupling levers 19 causes rotation of the rings 6 and 8 whereby the pins 21 move over the cam surfaces of slots 15, 16, 17 and 18 causing the slides 10 and the jaws 11, 13, 12, 14 to be moved inwards or outwards according to the direction of rotation.

To set the chuck for use with for example, a rectangular object such as a rectangular bulb for a cathode ray tube, the distance apart of the jaw pairs 11, 13 and 12, 14 are set so that in the extreme position their distances apart are just slightly greater than the two major dimensions of the object. With the object placed between the jaws 11, 13 and 12, 14, rotation of the ring 7 will cause an equal inward movement thereof until either the jaws 11 and 13 on the major axis or the jaws 12, 14 on the minor axis make contact with the object. When this occurs for example due to the jaws 11, 13 making contact with the object the pressure exerted by these jaws against the object will cause a cessation of rotation of the ring 6 but the centre ring 7 will continue to rotate taking the ring 8 round at double the speed due to the action of the levers 19 until the jaws 12, 14 actuated by this ring also make contact with the object. Further rotation of the driving ring 7 will then tighten all four jaws 11, 13 and 12, 14, on the object. If it is desired to use the chuck with a circular object the chuck is set to position the jaws to one or other of their extreme positions by changing their positions on the slides 10 so that the jaws 11, 13 and 12, 14 are at equal distances from the centre of the chuck.

It will be seen that a chuck constructed in the above manner is suitable for holding and centralising objects of various regular shapes e. g. circular, rectangular, elliptical, the only alteration required for the acceptance of various sizes and shapes being the re-positioning of the jaws 11, 13 and 12, 14 on the slides 10. Although the invention has been described with particular reference to a chuck for a glass working lathe it is in no way limited to such, since the jaw actuating mechanism described could be applied wherever jaw mechanism is provided for the holding articles of various shapes.

What I claim is:

1. A chuck comprising a supporting member carrying more than two jaws, radially positioned guides mounting said jaws for radial movement and jaw operating mechanism therefor, said mechanism comprising first and second rotary members each having at least one jaw coupled thereto and common driving means inter-coupling said first and second members for imparting rotary motion to said members to cause simultaneous radial movement of all of said jaws and radial movement of at least one of said jaws after the other jaws are in engagement with an object.

2. A chuck comprising a supporting member carrying two oppositely disposed pairs of jaws radially positioned guides mounting said jaws for radial movement and jaw operating mechanism therefor, said mechanism comprising first and second rotary members each having one pair of said jaws coupled thereto and common driving means inter-coupling said first and second members for imparting rotary motion to said members to cause simultaneous radial movement of all of said jaws and radial movement of one pair of jaws after the other pair of jaws is in engagement with an object.

3. A chuck comprising a supporting member carrying two oppositely disposed pairs of jaws, radially positioned guides mounting said jaws for radial movement and jaw operating mechanism therefor, said mechanism including a group of three concentric rings, means coupling the centre ring to the inner and outer rings, means for imparting rotary movement to said centre ring thereby to cause rotation of said inner and outer rings simultaneously, cam surfaces angularly disposed on said inner and outer rings and cam followers in engagement with said cams and said jaws thereby to cause said jaws to be moved simultaneously towards an object on rotary movement of said centre ring, and radial movement of one pair of jaws after the other pair of jaws is in engagement with said object.

4. A chuck comprising a supporting member carrying more than two jaws, radially positioned guides mounting said jaws for radial movement and jaw operating mechanism therefor, said mechanism including a group of three concentric rings, coupling means from the inner and outer rings of said group to said jaws to cause radial movement thereof on rotation of said inner and outer rings, lever means pivoted to the centre ring of said group and means coupling said lever means to said inner and outer rings at points remote from the pivotal point on said centre ring, and means mounting said lever means at said remote points to permit angular movement of said lever means relatively to said remote points, and means for causing rotation of said centre ring and thereby simultaneous radial movements of said jaws.

5. A chuck comprising a supporting member carrying two oppositely disposed pairs of jaws, radially positioned guides mounting said jaws for radial movement and jaw operating mechanism therefor, said mechanism including a group of three concentric rings, cam surfaces angularly disposed on the inner and outer rings of said group, cam followers in engagement with said cams and said jaws and lever means pivoted to the centre ring of the group, means coupling said lever means to the inner and outer rings at points remote from the pivotal point on the centre ring, means mounting said lever means at said remote points to permit angular movement of said lever means relatively to said remote points and means for causing rotation of said centre ring and thereby simultaneous radial movement of said jaws.

References Cited in the file of this patent

UNITED STATES PATENTS

| 767,678 | Barnaby | Aug. 16, 1904 |
| 1,713,803 | Whiton | May 21, 1929 |